(12) United States Patent
Munezawa (10) Patent No.: US 9,931,895 B2
(45) Date of Patent: Apr. 3, 2018

(54) PNEUMATIC TIRE

(71) Applicant: SUMITOMO RUBBER INDUSTRIES LTD., Kobe-shi (JP)

(72) Inventor: Goro Munezawa, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 410 days.

(21) Appl. No.: 14/612,624

(22) Filed: Feb. 3, 2015

(65) Prior Publication Data

US 2015/0217605 A1  Aug. 6, 2015

(30) Foreign Application Priority Data

Feb. 6, 2014 (JP) ................. 2014-020866

(51) Int. Cl.
*B60C 15/06* (2006.01)
*B60C 15/00* (2006.01)

(52) U.S. Cl.
CPC ...... *B60C 15/0603* (2013.01); *B60C 15/0009* (2013.01); *B60C 15/0054* (2013.01); *B60C 15/0607* (2013.01); *B60C 2015/009* (2013.01); *B60C 2015/061* (2013.01); *B60C 2015/0614* (2013.01); *B60C 2015/0617* (2013.01)

(58) Field of Classification Search
CPC . B60C 15/00; B60C 15/0009; B60C 15/0027; B60C 15/0054; B60C 2015/009; B60C 15/06; B60C 15/0603; B60C 15/0607; B60C 2015/061; B60C 2015/0614; B60C 2015/0617; B60C 2015/0621; B60C 2015/0625; B60C 2001/0058

USPC ........ 152/525, 537, 547, 564, 539–543, 546
See application file for complete search history.

(56) References Cited

U.S. PATENT DOCUMENTS

| | | | | |
|---|---|---|---|---|
| 5,180,457 A | * | 1/1993 | Honbo | B60C 15/06 152/541 |
| 5,620,539 A | * | 4/1997 | Ide | B60C 9/14 152/539 |
| 2006/0157182 A1 | * | 7/2006 | Lahure | B60C 15/06 152/541 |
| 2012/0073724 A1 | * | 3/2012 | Daval | B60C 15/06 152/541 |

(Continued)

FOREIGN PATENT DOCUMENTS

JP    2005-255047 A    9/2005

*Primary Examiner* — Eric Hug
(74) *Attorney, Agent, or Firm* — Oblon, McClelland, Maier & Neustadt, L.L.P.

(57) ABSTRACT

A pneumatic tire includes a tread, sidewalls, clinches, beads, a carcass, and strips. Each bead includes a core, a first apex and a second apex, the carcass includes a carcass ply which is turned up around the core from the axially inner side toward outer side such that the carcass ply is divided into a main portion and a turn-up portion, each strip has radially inner edge positioned between the main and turn-up portions, the second apex is positioned between the turn-up portion and each clinch, each strip has outer edge positioned to correspond to or on inner side of a point of maximum width of the tire in radial direction, the second apex has outer edge positioned on radially inner side of the outer edge of each strip, and the second apex includes crosslinked rubber and has complex elastic modulus in range of from 60 MPa to 70 MPa.

20 Claims, 2 Drawing Sheets

(56) References Cited

U.S. PATENT DOCUMENTS

| | | | |
|---|---|---|---|
| 2012/0145302 A1* | 6/2012 | Feltes | B60C 15/0027 |
| | | | 152/541 |
| 2012/0325390 A1* | 12/2012 | Bourgeois | B60C 15/06 |
| | | | 152/541 |
| 2014/0083591 A1* | 3/2014 | Ito | B60C 15/04 |
| | | | 152/541 |
| 2015/0183277 A1* | 7/2015 | Bourgeois | B60C 15/0603 |
| | | | 152/541 |

* cited by examiner

PNEUMATIC TIRE

CROSS-REFERENCE TO RELATED APPLICATIONS

The present application is based upon and claims the benefit of priority to Japanese Patent Application No. 2014-020866, filed Feb. 6, 2014, the entire contents of which are incorporated herein by reference.

BACKGROUND OF THE INVENTION

Field of the Invention

The present invention relates to a pneumatic tire, more specifically to a pneumatic tire to be mounted on a passenger car.

Description of Background Art a pair of beads is provided for a tire. A carcass is set to bridge the beads on both sides. A bead has a core and an apex extending from the core in a radially outward direction. A carcass ply of the carcass is usually turned up around the core from the axially inner side toward the outer side. Due to such a structure, the carcass ply is divided into a main portion and a turn-up portion. The bead portion of a tire is fixed onto a rim.

SUMMARY OF THE INVENTION

According to one aspect of the present invention, a pneumatic tire includes a tread having an outer surface setting a tread surface, a pair of sidewalls extending from tread edges approximately in a radially inward direction, respectively, a pair of clinches extending from sidewall edges approximately in the radially inward direction, respectively, a pair of beads positioned on axially inner sides of the clinches, respectively, a carcass spreading along an inner side of the tread and sidewalls such that the carcass bridges one of the beads on one side and the other one of the beads on the other side, and a pair of strips extending from the beads along the carcass approximately in a radially outward direction, respectively. Each of the beads includes a core, a first apex extending from the core in the radially outward direction, and a second apex positioned on an axially outer side of the first apex, the carcass includes a carcass ply which is turned up around the core from the axially inner side toward an outer side such that the carcass ply is divided into a main portion and a turn-up portion, each of the strips has a radially inner edge positioned between the main portion and the turn-up portion, the second apex is positioned between the turn-up portion and each of the clinches, each of the strips has an outer edge positioned to correspond to or on an inner side of a point of maximum width of the pneumatic tire in a radial direction, the second apex has an outer edge positioned on a radially inner side of the outer edge of each of the strips, and the second apex includes a crosslinked rubber and has a complex elastic modulus in a range of from 60 MPa to 70 MPa.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

The embodiments will now be described with reference to the accompanying drawings, wherein like reference numerals designate corresponding or identical elements throughout the various drawings.

Figure 1:
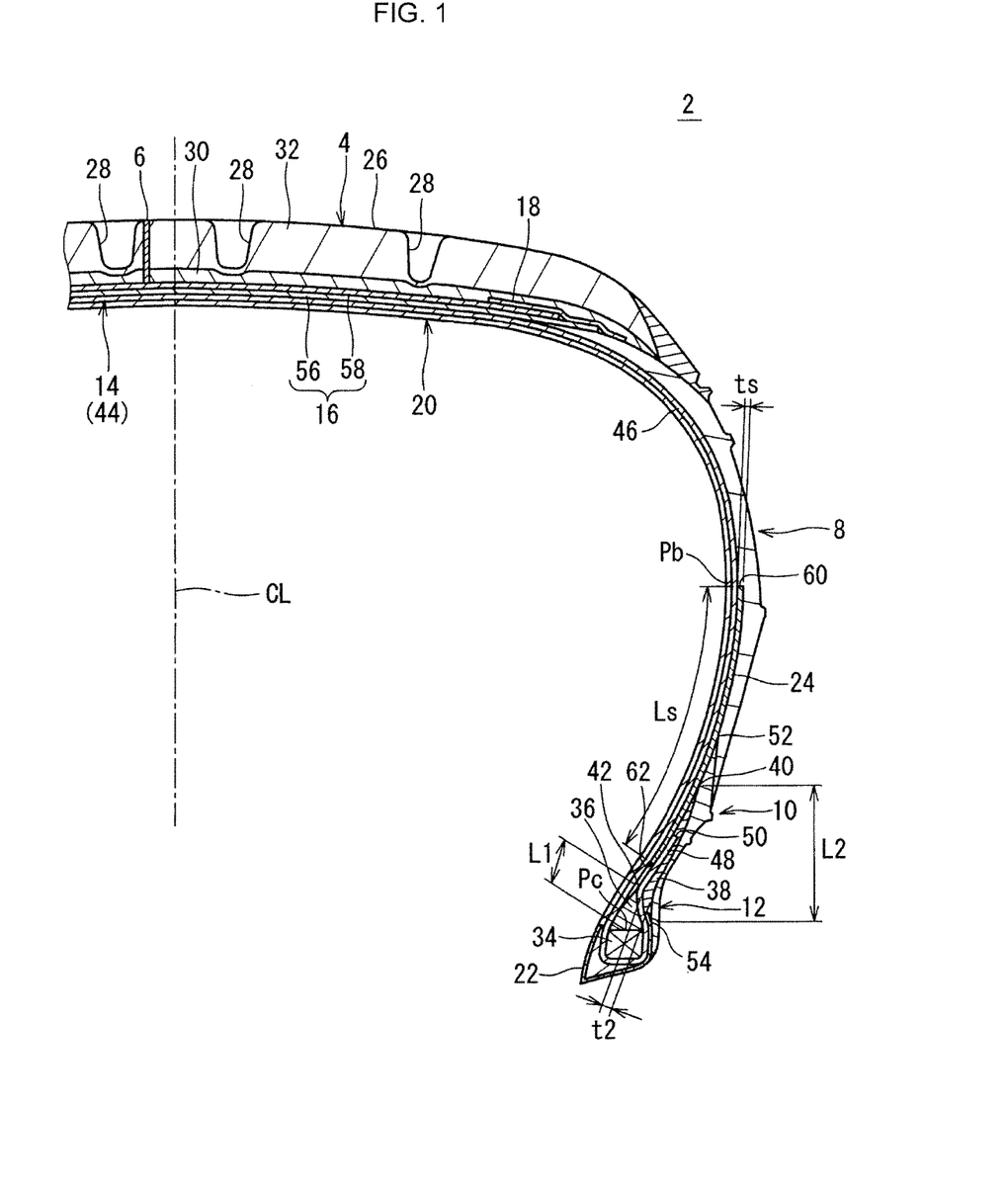
FIG. 1 is a cross-sectional view showing part of the pneumatic tire according to an embodiment of the present invention.

FIG. 1 shows pneumatic tire 2. In FIG. 1, vertical directions correspond to radial directions of tire 2, lateral directions correspond to axial directions of tire 2, and directions perpendicular to the drawing sheet are circumferential directions of tire 2. Dotted line (CL) in FIG. 1 indicates the equatorial plane of tire 2. Except for the tread patterns, tire 2 is shaped to be substantially symmetrical at the equatorial plane.

Tire 2 includes tread 4, penetrating portion 6, sidewall 8, clinch 10, bead 12, carcass 14, belt 16, edge band 18, inner liner 20, chafer 22 and strip 24. Tire 2 is a tubeless tire. Tire 2 is for equipping on a passenger car.

What is denoted as (Pb) in FIG. 1 is a point on the inner surface of tire 2. At point (Pb), the width of tire 2 reaches its maximum, measured in an axial direction shown on the internal profile. The maximum width of tire 2 is measured at point (Pb) to be the length in an axial direction between both sides (outer surfaces of sidewalls 8). In other words, point (Pb) is the point of maximum width of tire 2.

Tread 4 is in a convex shape in a radially outward direction. Tread 4 forms tread surface 26, which makes contact with the road surface. Grooves 28 are formed in tread 4 and shape a tread pattern. Tread 4 is made up of base layer 30 and cap layer 32. Cap layer 32 is disposed on the radially outer side of base layer 30. Cap layer 32 is laminated on base layer 30. Base layer 30 is made of a crosslinked rubber with excellent adhesiveness. The typical rubber material for base layer 30 is natural rubber. Cap layer 32 is made of a crosslinked rubber with excellent wear resistance, heat resistance and grip capability.

Penetrating portion 6 penetrates through tread 4. One end of penetrating portion 6 is exposed on tread surface 26. The other end of penetrating portion 6 is in contact with belt 16. Penetrating portion 6 extends along the tire circumference. In other words, penetrating portion 6 is shaped to be a ring. However, instead of a ring shape, it is an option for tire 2 to have multiple penetrating portions 6 separated from each other. Penetrating portion 6 is made of a conductive crosslinked rubber.

Sidewall 8 extends from the edge of tread 4 in an approximately radially inward direction. The radially outer edge of sidewall 8 is bonded to tread 4. The radially inner edge of sidewall 8 is bonded to clinch 10. Sidewall 8 is made of a crosslinked rubber with excellent cut resistance and weather resistance. Sidewall 8 prevents damage to carcass 14.

Clinch 10 is positioned on the approximately radially inner side of sidewall 8. Clinch 10 is positioned on the axially outer side of bead 12 and carcass 14. Clinch 10 is made of a crosslinked rubber with excellent wear resistance. Clinch 10 abuts the flange of a rim.

Bead 12 is positioned on the axially inner side of clinch 10. Bead 12 is formed with core 34, first apex 36 and second apex 38. Core 34 is in a ring shape, and includes a wound non-stretchable wire. The typical material for the wire is steel. First apex 36 extends from core 34 in a radially outward direction. First apex 36 tapers in a radially outward direction. Second apex 38 is disposed on the axially outer side of first apex 36. Between clinch 10 and carcass 14, second apex 38 extends from first apex 36 in a radially outward direction. In tire 2, outer edge 40 of second apex 38 is positioned on the radially outer side of outer edge 42 of first apex 36. Outer edge 40 of second apex 38 may be positioned on the radially inner side of outer edge 42 of first apex 36.

First apex 36 of tire 2 is produced by crosslinking a rubber composition. Namely, first apex 36 is made of a crosslinked rubber. A preferred base rubber for the rubber composition is a diene-based rubber. Specific examples of diene-based rubbers are natural rubber (NR), polyisoprene (IR), polybutadiene (BR), acrylonitrile-butadiene copolymer (NBR) and polychloroprene (CR). Those rubbers may be used in combination of two or more.

The rubber composition for forming first apex 36 is preferred to contain sulfur. Sulfur causes rubber molecules to crosslink. Together with sulfur or instead of sulfur, another crosslinking aide may be used. Alternatively, electron beams may be used to cause crosslinking.

The rubber composition for forming first apex 36 is preferred to contain sulfur and a vulcanization accelerator. Examples are sulfenamide-based, guanidine-based, thiazole-based, thiuram-based, or dithiocarbamate-based vulcanization accelerators.

The rubber composition for forming first apex 36 contains reinforcing material. Typical reinforcing material is carbon black. For example, carbon blacks with fast extruding furnace (FEF), general purpose furnace (GPF), high abrasion furnace (HAF), super abrasion furnace (SAF) and intermediate SAF (ISAF) grades may be used. Considering the strength of first apex 36, the amount of carbon black is preferred to be no less than 5 parts by mass based on 100 parts by mass of base rubber material. Considering the softness of first apex 36, the amount of carbon black is preferred to be no greater than 50 parts by mass. Together with carbon black or instead of carbon black, silica may be used. In such a case, dry silica or wet silica is used.

The rubber composition for forming first apex 36 contains a softening agent. Examples of preferred softening agents are paraffinic, naphthenic, and aromatic processing oils. Considering the softness of first apex 36, the amount of a softening agent is preferred to be no less than 10 parts by mass based on 100 parts by mass of rubber base. Considering the strength of first apex 36, the amount of a softening agent is preferred to be no greater than 40 parts by mass.

Stearic acid, zinc oxide, antiaging agents, wax, crosslinking aides or the like may be added to the rubber composition, if necessary, to form first apex 36.

Second apex 38 of tire 2 is produced by crosslinking a rubber composition. A preferred rubber base for the rubber composition is a diene-based rubber. Specific examples of diene-based rubbers are natural rubber (NR), polyisoprene (IR), polybutadiene (BR), acrylonitrile-butadiene copolymer (NBR) and polychloroprene (CR) rubbers. Those rubbers may be used in combination of two or more.

The rubber composition for forming second apex 38 is preferred to contain sulfur. Sulfur causes rubber molecules to crosslink. Together with sulfur or instead of sulfur, another crosslinking aide may be used. Alternatively, electron beams may be used to cause crosslinking.

The rubber composition for forming second apex 38 is preferred to contain sulfur and a vulcanization accelerator. Examples are sulfenamide-based, guanidine-based, thiazole-based, thiuram-based, or dithiocarbamate-based vulcanization accelerators.

The rubber composition for forming second apex 38 contains reinforcing material. Typical reinforcing material is carbon black. For example, carbon blacks with FEF, GPF, HAF, ISAF and SAF grades may be used. Considering the strength of second apex 38, the amount of carbon black is preferred to be no less than 5 parts by mass based on 100 parts by mass of base rubber. Considering the softness of second apex 38, the amount of carbon black is preferred to be no greater than 50 parts by mass. Together with carbon black or instead of carbon black, silica may be used. In such a case, dry silica or wet silica is used.

The rubber composition for forming second apex 38 contains a softening agent. Examples of preferred softening agents are paraffinic, naphthenic, and aromatic processing oils. Considering the softness of second apex 38, the amount of a softening agent is preferred to be no less than 10 parts by mass based on 100 parts by mass of base rubber. Considering the strength of second apex 38, the amount of a softening agent is preferred to be no greater than 40 parts by mass.

Stearic acid, zinc oxide, antiaging agents, wax, crosslinking aides or the like may be added to the rubber composition, when applicable, to form second apex 38.

Carcass 14 is formed with carcass ply 44. Carcass ply 44 is bridged between beads 12 on both sides. Carcass ply 44 is formed along the inner side of tread 4 and sidewalls 8. Carcass ply 44 is turned up around core 34 from the axially inner side toward the outer side. Because of such a turned-up structure, carcass ply 44 is divided into main portion 46 and turn-up portion 48. In tire 2, edge 50 of turn-up portion 48 is positioned on the radially inner side of point (Pb) of maximum width. Edge 50 of turn-up portion 48 is positioned on the radially inner side of outer edge 52 of clinch 10. Edge 50 of turn-up portion 48 is positioned between inner edge 54 and outer edge 40 of second apex 38 in a radial direction. Carcass 14 has a so-called "low turn-up structure."

Carcass ply 44 is made of multiple cords arranged parallel to each other and of topping rubber. The absolute value of the angle each cord makes with respect to the equatorial plane is 75~90 degrees. In other words, carcass 14 has a radial structure. Cords are made of organic fibers. Preferred examples of organic fibers are polyester fibers, nylon fibers, rayon fibers, polyethylene naphthalate fibers, and aramid fibers. Carcass 14 may be formed with two or more sheets of carcass ply 44. However, carcass 14 is preferred to be formed with one sheet of carcass ply 44, considering the impact on the tire mass.

Belt 16 is disposed on the radially inner side of tread 4. Belt 16 is laminated on carcass 14. Belt 16 reinforces carcass 14. Belt 16 is made up of inner layer 56 and outer layer 58. As seen in FIG. 1, the width of inner layer 56 is slightly greater than the width of outer layer 58 in an axial direction. Although not shown in the drawings, inner layer 56 and outer layer 58 are each made of multiple cords arranged parallel to each other and of topping rubber. Each cord inclines to the equatorial plane. Generally, the absolute value of the inclination angle is at least 10 degrees but no greater than 35 degrees. With respect to the equatorial plane, the inclination direction of cords in inner layer 56 is opposite the inclination direction of cords in outer layer 58. The preferred material of cords is steel. Alternatively, organic fibers may be used for cords. The width in an axial direction of belt 16 is preferred to be at least 0.7 times the maximum width of tire 2. It is an option for belt 16 to have three or more layers.

Edge band 18 is disposed on the radially outer side of belt 16 and near the edge of belt 16. Although not shown, edge band 18 is made of cords and topping rubber. The cords are helically wound. The band has a so-called jointless structure. The cords extend in substantially a circumferential direction of the tire. The angle of the cords with respect to the circumference is 5 degrees or less, preferably 2 degrees or less. Since the edge of belt 16 is bound by the cords, lifting is suppressed at belt 16. The cords are made of organic fibers. Preferred examples of organic fibers are nylon fibers, polyester fibers, rayon fibers, polyethylene naphthalate fibers and aramid fibers.

Inner liner 20 is disposed on the inner side of carcass 14. Inner liner 20 is bonded to the inner surface of carcass 14. Inner liner 20 is made of a crosslinked rubber with excellent air shielding properties. The typical base rubber for inner liner 20 is butyl rubber or halogenated butyl rubber. Inner liner 20 retains the inflation pressure of tire 2.

Chafer 22 is disposed near bead 12. When tire 22 is mounted on a rim, chafer 22 abuts the rim. Because of such a structure, the vicinity of bead 12 is protected. In the present embodiment, chafer 22 is made of cloth and rubber impregnated in the cloth. It is an option for chafer 22 to be integrated with clinch 10. In such a case, the material for chafer 22 is the same as that for clinch 10.

Strip 24 is disposed on the axially outer side of main portion 46 of carcass ply 44. Strip 24 extends from bead 12 along main portion 46 in an approximately radially outward direction. The outer edge 60 of strip 24 is positioned on the radially outer side of outer edge 52 of clinch 10. The inner edge 62 of strip 24 is positioned on the radially inner side of outer edge 40 of second apex 38.

Strip 24 of tire 2 is produced by cross-linking a rubber composition. A preferred base rubber for the rubber composition is a diene-based rubber. Specific examples of diene-based rubbers are natural rubber (NR), polyisoprene (IR), polybutadiene (BR), acrylonitrile-butadiene copolymer (NBR) and polychloroprene (CR) rubbers. Those rubbers may be used in combination of two or more.

The rubber composition for forming strip 24 is preferred to contain sulfur. Sulfur causes rubber molecules to cross-link. Together with sulfur or instead of sulfur, another crosslinking aide may be used. Alternatively, electron beams may be used to cause crosslinking.

The rubber composition for forming strip 24 is preferred to contain sulfur and a vulcanization accelerator. Examples are sulfenamide-based, guanidine-based, thiazole-based, thiuram-based, or dithiocarbamate-based vulcanization accelerators.

The rubber composition for forming strip 24 contains reinforcing material. Typical reinforcing material is carbon black. For example, carbon blacks such as FEF, GPF, HAF, ISAF and SAF grade carbon black may be used. Considering the strength of strip 24, the amount of carbon black is preferred to be no less than 5 parts by mass based on 100 parts by mass of base rubber. Considering the softness of strip 24, the amount of carbon black is preferred to be no greater than 50 parts by mass. Together with carbon black or instead of carbon black, silica may be used. In such a case, dry silica or wet silica is used.

The rubber composition for forming strip 24 contains a softening agent. Examples of preferred softening agents are paraffinic, naphthenic and aromatic processing oils. Considering the softness of strip 24, the amount of a softening agent is preferred to be no less than 10 parts by mass based on 100 parts by mass of base rubber. Considering the strength of strip 24, the amount of a softening agent is preferred to be no greater than 40 parts by mass.

Stearic acid, zinc oxide, antiaging agents, wax, crosslinking aides or the like may be added to the rubber composition for forming strip 24.

Figure 2:
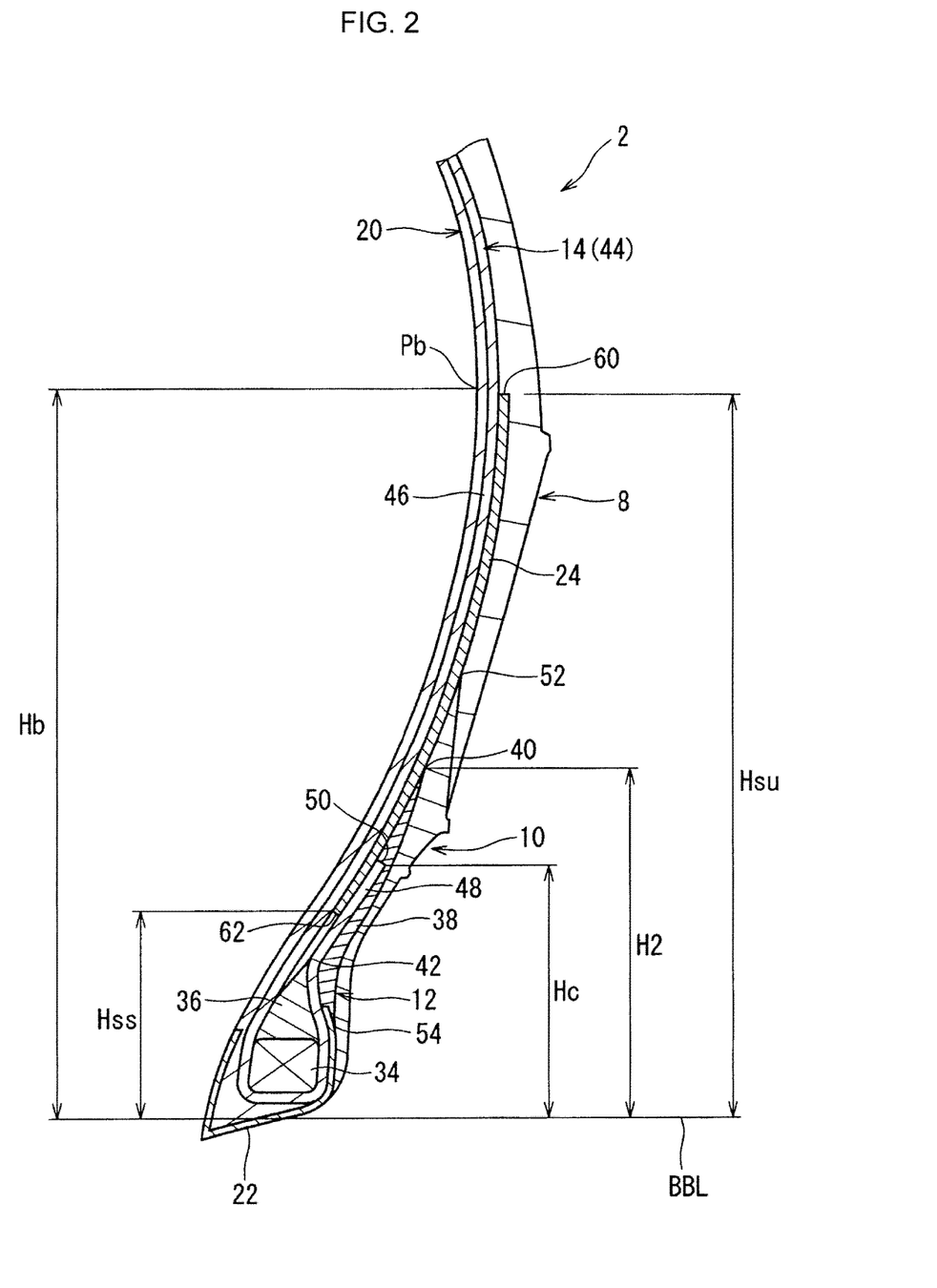
FIG. 2 is an enlarged cross-sectional view showing part of the tire in FIG. 1.

FIG. 2 is a view showing part of tire 2 in FIG. 1. FIG. 2 shows the vicinity of bead 12 of tire 2. In FIG. 2, vertical directions correspond to the radial directions of tire 2, lateral directions correspond to the axial directions of tire 2, and directions perpendicular to the drawing sheet correspond to circumferential directions of tire 2.

In tire 2, second apex 38 is disposed between clinch 10 and turn-up portion 48 of carcass ply 44. Turn-up portion 48 of tire 2 is positioned further on an axially inner side than is the turn-up portion of a conventional tire. Such a structure suppresses concentration of deformation on turn-up portion 48. Accordingly, since ply loose is suppressed from occurring, durability of tire 2 is excellent.

The inner edge 62 of strip 24 in tire 2 is positioned between main portion 46 and turn-up portion 48 of carcass ply 44. As described above, strip 24 extends from bead 12 along main portion 46 in an approximately radially outward direction. The position of outer edge 60 of strip 24 corresponds to point (Pb) of maximum width of tire 2, or the position is located on the inner side of point (Pb) of maximum width, in a radial direction. Along with second apex 38, strip 24 contributes to the planar torsional rigidity of tire 2. Since outer edge 40 of second apex 38 of tire 2 is positioned on the radially inner side of outer edge 60 of strip 24, strip 24 and second apex 38 properly contribute to the planar torsional rigidity of tire 2. The steering stability of tire 2 is properly maintained by strip 24 and second apex 38. Abnormal deformation of tire 2 is suppressed by strip 24 and second apex 38. Strip 24 and second apex 38 contribute to the durability of tire 2. According to an embodiment of the present invention, a pneumatic tire with enhanced durability is obtained without lowering steering stability.

As described above, the position of outer edge 60 of strip 24 corresponds to point (Pb) of maximum width of tire 2, or the position is located on the inner side of point (Pb) of maximum width, in a radial direction. Due to such a position, strip 24 has less impact on rolling resistance. Since the rolling resistance is properly adjusted, tire 2 contributes to lowering the fuel consumption of the vehicle.

In tire 2, outer edge 42 of first apex 36 is preferred to be on the radially inner side of outer edge 40 of second apex 38. By so setting, a smaller first apex 36 is achieved. A smaller first apex 36 provides carcass ply 44 with a proper outline (also referred to as a case line). More specifically, in a cross section perpendicular to the circumference of tire 22, the outline of carcass ply 44 comes closer to a single arc. Such an outline suppresses concentration of deformation. A smaller first apex 36 contributes to enhancing durability. Furthermore, in tire 2 structured as above, the entire portion of sidewall 8 warps properly. Sidewall 8 as a whole contributes effectively to the rigidity of tire 2. Such warping contributes to the steering stability of tire 2.

A smaller first apex 36 reduces volume in the vicinity of bead 12. A smaller volume makes the portion of bead 12 softer. A softer structure affects the longitudinal rigidity of tire 2. Since a decrease in the longitudinal rigidity reduces vibration, noise decreases in tire 2. Especially, a smaller first apex 36 is effective in reducing noise in a frequency range of 80~100 Hz. Thus, tire 2 exhibits excellent quietness. Moreover, a smaller first apex 36 decreases the mass of tire 2. A smaller mass of tire 2 lowers the rolling resistance of tire 2. Tire 2 with less rolling resistance contributes to lowering the fuel consumption of the vehicle.

The complex elastic modulus (E2) of second apex 38 is at least 60 MPa but no greater than 70 MPa in tire 2. When modulus (E2) is set at 60 MPa or greater, second apex 38 contributes to planar torsional rigidity. Tire 2 exhibits excellent steering stability. When modulus (E2) is set at 70 MPa or less, second apex 38 has less impact on the rigidity of tire 2. The riding comfort of the vehicle is properly maintained.

The loss tangent (T2) of second apex 38 in tire 2 is preferred to be 0.18 or lower. When loss tangent (T2) is set at 0.18 or lower, heat generation is suppressed in second apex 38. Second apex 38 contributes to durability. Since less heat generation in tire 2 lowers rolling resistance, tire 2 contributes to a decrease in the fuel consumption of the vehicle. From that viewpoint, loss tangent (T2) is more preferred to be 0.14 or lower. Since a smaller loss tangent (T2) is preferred, a lower limit is not set for loss tangent (T2).

In the embodiments of the present invention, complex elastic modulus (E2) and loss tangent (T2) of second apex 38 are measured according to the standards in "JIS K 6394." The measurement conditions are as follows. The later-described complex elastic modulus (E1) and loss tangent (T1) of first apex 36, as well as the complex elastic modulus (Es) and loss tangent (Ts) of strip 24, are also measured the same as complex elastic modulus (E2) and loss tangent (T2).

visco-elastic spectrometer: "VESF-3" made by Iwamoto Seisakusho K.K.
initial deformation: 10%
dynamic deformation: ±1%
frequency: 10 Hz
mode to cause deformation: tensile force
temperature: 70° C.

The complex elastic modulus (E1) of first apex 36 in tire 2 is preferred to be at least 60 MPa but no greater than 70 MPa. When elastic modulus (E1) is set at 60 MPa or greater, first apex 36 contributes to supporting tire 2. Tire 2 exhibits excellent steering stability. When modulus (E1) is set at 70 MPa or less, first apex 36 has less impact on the rigidity of tire 2. The riding comfort of the vehicle is properly maintained.

The loss tangent (T1) of first apex 36 in tire 2 is preferred to be 0.18 or lower. When loss tangent (T1) is set at 0.18 or lower, heat generation is suppressed in first apex 36. First apex 36 contributes to durability. Since less heat generation lowers the rolling resistance of tire 2, tire 2 contributes to a decrease in the fuel consumption of the vehicle. From that viewpoint, loss tangent (T1) is more preferred to be 0.14 or lower. Since a lower loss tangent (T1) is preferred, a lower limit is not set for loss tangent (T1).

The complex elastic modulus (Es) of strip 24 is at least 60 MPa but no greater than 70 MPa in tire 2. When modulus (Es) is at 60 MPa or greater, strip 24 contributes to planar torsional rigidity. Tire 2 exhibits excellent steering stability. When modulus (Es) is set at 70 MPa or less, strip 24 has less impact on the rigidity of tire 2. The riding comfort of the vehicle is properly maintained when it is equipped with tire 2.

The loss tangent (Ts) of strip 24 in tire 2 is preferred to be 0.18 or lower. When loss tangent (Ts) is set at 0.18 or lower, heat generation is suppressed in strip 24. Strip 24 contributes to durability. Since less heat generation lowers the rolling resistance of tire 2, tire 2 contributes to a decrease in the fuel consumption of the vehicle. From that viewpoint, loss tangent (Ts) is more preferred to be 0.14 or lower. Since a lower loss tangent (Ts) is preferred, a lower limit is not set for loss tangent (Ts).

As described above, first apex 36, second apex 38 and strip 24 in tire 2 are each made of a crosslinked rubber. From a productivity point of view, first apex 36 is preferred to be made of a crosslinked rubber with the same properties as that of second apex 38. For the same reason, strip 24 is preferred to be made of a crosslinked rubber with the same properties as that of second apex 38. Especially preferred is that first apex 36 and strip 24 are both made of a crosslinked rubber with the same properties as that of second apex 38. Namely, first apex 36, second apex 38 and strip 24 are preferred to be formed by crosslinking the same rubber composition.

In FIG. 1, two-way arrow (L1) indicates the length of first apex 36. Length (L1) is measured from the axially central point on the bottom of first apex 36 (denoted as (Pc) in FIG. 1) to its outer edge 42. Two-way arrow (L2) indicates the length of second apex 38. Length (L2) is measured in a radial direction from inner edge 54 to outer edge 40 of second apex 38. Two-way arrow (Ls) indicates the length of strip 24. Length (Ls) is measured from inner edge 62 to outer edge 60 of strip 24. Length (Ls) is measured along strip 24. Two-way arrow (t2) is the thickness of second apex 38. Two-way arrow (ts) is the thickness of strip 24. Thicknesses (t2, ts) each indicate their respective maximum thicknesses.

In tire 2, length (L1) is preferred to be at least 5 mm but no greater than 40 mm. When length (L1) is set at 5 mm or greater, first apex 36 contributes effectively to lateral rigidity. Tire 2 exhibits excellent steering stability. When length (L1) is set at 40 mm or less, carcass 14 achieves a proper outline. Carcass 14 contributes to the durability of tire 2. Moreover, in tire 2 having carcass 14 with a proper outline, the entire portion of sidewall 8 warps properly. Since the entire portion of sidewall 8 contributes effectively to rigidity, the steering stability of tire 2 is excellent. In addition, a smaller first apex 36 contributes to reducing noise as described above. From those viewpoints, length (L1) is more preferred to be 20 mm or less, even more preferably 15 mm or less. If length (L1) is less than 5 mm, it may be hard to produce tire 2 and its production cost may increase.

In tire 2, length (L2) is preferred to be at least 15 mm but no greater than 40 mm. When length (L2) is set at 15 mm or greater, second apex 38 contributes to planar torsional rigidity. Tire 2 exhibits excellent steering stability. When outer edge 40 of second apex 38 is positioned on the radially outer side of the flange of a rim (not shown) onto which tire 2 is mounted, the collapse of bead 12 is effectively prevented. The height of the flange of a normal rim is 20 mm. Thus, length (L2) is more preferred to be 20 mm or greater. When length (L2) is set at 40 mm or less, the production cost of tire 2 is properly maintained. From those viewpoints, length (L2) is more preferred to be 35 mm or less. An especially preferred range of length (L2) is 25 mm to 30 mm.

In tire 2, length (Ls) is preferred to be at least 40 mm but no greater than 70 mm. When length (Ls) is set at 40 mm or greater, strip 24 contributes to planar torsional rigidity. Tire 2 exhibits excellent steering stability. From that viewpoint, length (Ls) is more preferred to be 50 mm or greater. When length (Ls) is set at 70 mm or less, strip 24 has less impact on the rigidity of tire 2. The riding comfort of the vehicle is properly maintained.

Thickness (t2) is preferred to be at least 1 mm but no greater than 4 mm in tire 2. When thickness (t2) is set at 1 mm or greater, second apex 38 contributes to planar torsional rigidity. Tire 2 exhibits excellent steering stability. When thickness (t2) is set at 4 mm or less, the volume of second apex 38 is properly maintained. Heat is less likely to be generated in bead 12, and ply loose is effectively suppressed at edge 50 of turn-up portion 48. Tire 2 exhibits excellent durability.

In tire 2, thickness (ts) is preferred to be 0.5 mm or greater but no greater than 2 mm. When thickness (ts) is set at 0.5 mm or greater, strip 24 contributes to planar torsional rigidity. Tire 2 exhibits excellent steering stability. When thickness (ts) is set at 2 mm or less, strip 24 is less likely to affect the tire mass. Since the mass of tire 2 is at a proper level, rolling resistance and cost will not increase.

In FIG. 2, solid line (BBL) indicates the bead base line. The bead base line regulates the rim diameter (see JATMA) of a rim (not shown) on which tire 2 is mounted. The bead base line extends in an axial direction. Two-way arrow (Hb) indicates the height measured in a radial direction from the bead base line to point (Pb) of maximum width. Height (Hb) indicates the base height in the embodiments of the present invention. Two-way arrow (Hss) indicates the height measured in a radial direction from the bead base line to inner edge 62 of strip 24. Two-way arrow (Hsu) indicates the height measured in a radial direction from the bead base line to outer edge 60 of strip 24. Two-way arrow (H2) indicates the height measured in a radial direction from the bead base line to outer edge 40 of second apex 38. Two-way arrow (Hc) indicates the height measured in a radial direction from the bead base line to edge 50 of turn-up portion 48. Since carcass 14 of tire 2 has a low turn-up structure, base height (Hb) and height (Hc) are set to have a ratio (Hb/Hc) of 0.3 to 0.4.

As described above, the position of outer edge 60 of strip 24 corresponds to point (Pb) of maximum width of tire 2, or the position is located on the inner side of point (Pb) of maximum width, in a radial direction. Therefore, the ratio of height (Hsu) to base height (Hb) is no greater than 1. Accordingly, strip 24 has less impact on rolling resistance. From the viewpoint of obtaining sufficient planar torsional rigidity, the ratio is preferred to be 0.7 or greater.

As described above, carcass 14 of tire 2 has a low turn-up structure, and the ratio of height (Hc) to base height (Hb) is in a range of 0.3 to 0.4. In tire 2, the ratio of height (Hss) to base height (Hb) is preferred to be 0.3 or lower. By so setting, inner edge 62 of strip 24 is disposed between main portion 46 and turn-up portion 48 of carcass ply 44. Strip 24 of tire 2 contributes effectively to planar torsional rigidity. From the viewpoint of properly maintaining production cost, the ratio is preferred to be 0.1 or greater.

In tire 2, the ratio of height (H2) to base height (Hb) is preferred to be in a range of 0.1 to 0.6. When the ratio is set at 0.1 or greater, second apex 38 effectively contributes to planar torsional rigidity. From that viewpoint, the ratio is more preferred to be 0.2 or greater. When the ratio is set at 0.6 or lower, the production cost is properly maintained. From that viewpoint, the ratio is more preferred to be 0.5 or lower.

In the embodiments of the present invention, the measurements and angles of each portion of tire 2 are obtained when the tire is mounted on a normal rim and air is filled in the tire at a normal inflation pressure. No load is exerted on tire 2 at the time of measurement. In the present application, a normal rim indicates a rim regulated by a regulatory system that includes standards for tire 2. Normal rims are "Normal Rim" in JATMA regulations, "Design Rim" in TRA regulations and "Measuring Rim" in ETRTO regulations. In the present application, a normal inflation pressure indicates the air pressure regulated by a regulatory system that includes standards for tire 2. For example, it is "Maximum Air Pressure" under JATMA regulations, maximum value described in "Tire Load Limits at Various Cold Inflation Pressures" under TRA regulations, and "Inflation Pressure" under ETRTO regulations. However, when tire 2 is for a passenger car, measurements and angles are taken when the inflation pressure is at 180 kPa.

EXAMPLES

The effects of an embodiment of the present invention are made clear by the examples shown below. However, it should be understood that the present invention is not limited to the descriptions provided in the examples.

Example 1

A pneumatic tire was prepared for Example 1 to have a basic structure as shown in FIG. 1 and the specifications described in Table 1 below. The tire size was 195/65R15. The first apex, the second apex and the strip were formed by crosslinking the same rubber composition. Thus, complex elastic modulus (E1) of the first apex, complex elastic modulus (E1) of the second apex, and complex elastic modulus (Es) of the strip are all the same. Loss tangent (T1) of the first apex, loss tangent (T2) of the second apex and loss tangent (Ts) of the strip are all the same.

Comparative Example 1

A tire was prepared for Comparative Example 1 the same as in Example 1 except that neither a second apex nor a strip was provided therein.

Comparative Example 2

A tire was prepared for Comparative Example 2 the same as in Example 1 except that a strip was not provided therein.

Example 2

A tire was prepared for Example 2 the same as in Example 1 except that elastic moduli (E1, E2, Es) and loss tangents (T1, T2, Ts) were set as shown in Table 1 below by changing the rubber composition for forming a first apex, second apex and strip.

Examples 3~7

Tires were prepared for Examples 3~7 the same as in Example 1 except that length (L1) of a first apex for each tire was set as shown in Table 2 below.

Example 8

A tire was prepared for Example 8 the same as in Example 1 except that loss tangents (T1, T2, Ts) were set as shown in Table 2 below by changing the rubber composition for forming a first apex, second apex and strip, and that length (L1) of the first apex was set as shown in Table 2.

Examples 9~13

Tires were prepared for Examples 9~13 the same as in Example 1 except that length (L2) of a second apex for each tire was set as shown in Table 3 below to change the ratio (H2/Hb) of height (H2) to base height (Hb).

Examples 14~16

Tires were prepared for Examples 14~16 the same as in Example 1 except that thickness (t2) of a second apex for each tire was set as shown in Table 4.

Examples 17~20 and Comparative Example 3

Tires were prepared for Examples 17~20 and Comparative Example 3 the same as in Example 1 except that length (Ls) of a strip for each tire was set as shown in Table 5 below to change the ratio (Hsu/Hb) of height (Hsu) to base height (Hb).

Examples 21~24 and Comparative Example 4

Tires were prepared for Examples 21~24 and Comparative Example 4 the same as in Example 1 except that length (Ls) of a strip for each tire was set as shown in Table 6 below to change the ratio (Hss/Hb) of height (Hss) to base height (Hb).

Examples 25~28

Tires were prepared for Examples 25~28 the same as in Example 1 except that thickness (ts) of a strip for each tire was set as shown in Table 7 below.

Example 29 and Comparative Examples 5~6

Tires were prepared for Example 29 and Comparative Examples 5~6 the same as in Example 1 except that elastic moduli (E1, E2, Es) were set as shown in Table 8 below by changing the rubber composition for forming a first apex, second apex and strip.

Measuring Planar Torsional Rigidity and Cornering Power

Planar torsional rigidity and cornering power were measured using a flat-belt type 6-component force measuring instrument under the following conditions.
  rim: 6.0 JJ
  inflation pressure: 210 kPa
  load: 2.55 kN
  speed: 80 km/h
  camber angle: 0 degrees
  slip angle: 1.0 degree Based on the planar torsional rigidity and cornering power for the tire of Comparative Example 1 each being set at 100, the results obtained in examples and comparative examples are shown as indices respectively in Tables 1~8 below. The greater the value, the greater the planar torsional rigidity and cornering power.

Evaluation of Lateral Rigidity

The horizontal spring constant of each tire was measured under the following conditions.
  rim: 6.0 JJ
  inflation pressure: 210 kPa
  load: 4.24 kN Based on the horizontal spring constant for the tire of Comparative Example 1 being set at 100, the results obtained in examples and comparative examples are shown as indices respectively in Tables 1~8 below. The greater the value, the greater the lateral rigidity.

Steering Stability and Riding Comfort

A tire was mounted on a rim of 6.0 JJ and air was filled at an inflation pressure of 210 kPa. The tire was equipped on a passenger car with a displacement of 1800 cc. A driver drove the car on a racing circuit and evaluated the steering stability and riding comfort. Steering stability was evaluated near N (neutral position), at the time of lane change, and when turning on a dry course (DRY turning). The results are shown as indices in Tables 1~8. The greater the value, the more preferable the result.

Durability

A tire was mounted on a normal rim and air was filled in the tire at an inflation pressure of 250 kPa. The tire was mounted on a drum-type driving tester with a drum radius of 1.7 meters. A vertical load of 8.15 kN was exerted on the tire and the tire was driven at 100 km/h for a distance until damage was observed. Based on the distance obtained in Comparative Example 1 being set at 100, the results in examples and comparative examples are shown as indices respectively in Tables 1~8 below. The greater the value, the more preferable the result.

Cost

The cost required for producing a tire was calculated. Based on the cost for the tire of Comparative Example 1 being set at 100, the results obtained in examples and comparative examples are shown as indices respectively in Tables 1~8 below. The greater the value, the more preferable the result.

Noise

Tires were each mounted on a rim with a size of 6.0 JJ and air was filled at an inflation pressure of 210 kPa. Those tires were equipped on a passenger car with a displacement of 1800 cc, which was driven at a speed of 60 km/h on an asphalt road with a rough surface. The noise level (dB) in the 100-Hz bandwidth detected at the driver's seat was measured using a directional microphone. Based on the noise value obtained in comparative example 1 being set at 100, the values in examples and comparative examples are shown as indices respectively in Tables 1~8 below. The smaller the value, the less the road noise.

Rolling Resistance

The rolling resistance of each tire was measured using a rolling resistance tester under the following conditions.
  rim: 6.0 JJ [made of aluminum alloy]
  inflation pressure: 210 kPa
  load: 4.82 kN
  speed: 80 km/h Based on the value in Comparative Example 1 being set at 100, the results obtained in the examples and comparative examples are shown as indices respectively in Tables 1~8 below. The smaller the value, the more preferable the result.

TABLE 1

[Evaluation Results]

| | | comp. example 1 | comp. example 2 | example 1 | example 2 |
|---|---|---|---|---|---|
| 1st apex | length L1 [mm] | 35 | 35 | 35 | 35 |
| | elastic modulus E1 [MPa] | 60 | 60 | 60 | 40 |
| | loss tangent T1 [—] | 0.18 | 0.18 | 0.18 | 0.14 |
| 2nd apex | ratio (H2/Hb) [—] | — | 0.54 | 0.54 | 0.54 |
| | length L2 [mm] | — | 30 | 30 | 30 |
| | thickness t2 [mm] | — | 2.0 | 2.0 | 2.0 |
| | elastic modulus E2 [MPa] | — | 60 | 60 | 40 |
| | loss tangent T2 [—] | — | 0.18 | 0.18 | 0.14 |
| strip | ratio (Hsu/Hb) [—] | — | — | 0.99 | 0.99 |
| | length Ls [mm] | — | — | 60 | 60 |
| | ratio (Hss/Hb) [—] | — | — | 0.18 | 0.18 |
| | thickness ts [mm] | — | — | 1.0 | 1.0 |
| | elastic modulus Es [MPa] | — | — | 60 | 40 |
| | loss tangent Ts [—] | — | — | 0.18 | 0.14 |

TABLE 1-continued

[Evaluation Results]

|  | comp. example 1 | comp. example 2 | example 1 | example 2 |
|---|---|---|---|---|
| planar torsional rigidity [—] | 100 | 101 | 110 | 107 |
| cornering power [—] | 100 | 100 | 106 | 103 |
| lateral rigidity [—] | 100 | 101 | 102 | 101 |
| near N [—] | 6.0 | 6.0 | 6.2 | 6.1 |
| lane change [—] | 6.0 | 6.0 | 6.2 | 6.1 |
| DRY cornering [—] | 6.0 | 6.0 | 6.2 | 6.1 |
| riding comfort [—] | 6.0 | 6.0 | 5.8 | 5.9 |
| durability [—] | 100 | 101 | 104 | 105 |
| cost [—] | 100 | 105 | 110 | 110 |
| noise [—] | 100 | 100 | 100 | 100 |
| rolling resistance [—] | 100 | 100 | 100 | 98 |

TABLE 2

[Evaluation Results]

|  |  | example 3 | example 4 | example 5 | example 6 | example 7 | example 8 |
|---|---|---|---|---|---|---|---|
| 1st apex | length L1 [mm] | 3 | 5 | 10 | 20 | 40 | 5 |
|  | elastic modulus E1 [MPa] | 60 | 60 | 60 | 60 | 60 | 60 |
|  | loss tangent T1 [—] | 0.18 | 0.18 | 0.18 | 0.18 | 0.18 | 0.14 |
| 2nd apex | ratio (H2/Hb) [—] | 0.54 | 0.54 | 0.54 | 0.54 | 0.54 | 0.54 |
|  | length L2 [mm] | 30 | 30 | 30 | 30 | 30 | 30 |
|  | thickness t2 [mm] | 2.0 | 2.0 | 2.0 | 2.0 | 2.0 | 2.0 |
|  | elastic modulus E2 [MPa] | 60 | 60 | 60 | 60 | 60 | 60 |
|  | loss tangent T2 [—] | 0.18 | 0.18 | 0.18 | 0.18 | 0.18 | 0.14 |
| strip | ratio (Hsu/Hb) [—] | 0.99 | 0.99 | 0.99 | 0.99 | 0.99 | 0.99 |
|  | length Ls [mm] | 60 | 60 | 60 | 60 | 60 | 60 |
|  | ratio (Hss/Hb) [—] | 0.18 | 0.18 | 0.18 | 0.18 | 0.18 | 0.18 |
|  | thickness ts [mm] | 1.0 | 1.0 | 1.0 | 1.0 | 1.0 | 1.0 |
|  | elastic modulus Es [MPa] | 60 | 60 | 60 | 60 | 60 | 60 |
|  | loss tangent Ts [—] | 0.18 | 0.18 | 0.18 | 0.18 | 0.18 | 0.14 |
|  | planar torsional rigidity [—] | 106 | 108 | 108 | 109 | 111 | 108 |
|  | cornering power [—] | 100 | 101 | 103 | 105 | 107 | 101 |
|  | lateral rigidity [—] | 90 | 95 | 97 | 99 | 103 | 95 |
|  | near N [—] | 6.0 | 6.3 | 6.3 | 6.2 | 6.2 | 6.3 |
|  | lane change [—] | 6.0 | 6.3 | 6.3 | 6.2 | 6.2 | 6.3 |
|  | DRY cornering [—] | 6.0 | 6.3 | 6.3 | 6.2 | 6.2 | 6.3 |
|  | riding comfort [—] | 6.0 | 6.1 | 6.1 | 6.0 | 5.7 | 6.1 |
|  | durability [—] | 102 | 115 | 112 | 110 | 104 | 120 |
|  | cost [—] | 100 | 95 | 97 | 99 | 110 | 95 |
|  | noise [—] | 100 | 95 | 97 | 99 | 100 | 100 |
|  | rolling resistance [—] | 100 | 100 | 100 | 100 | 101 | 98 |

TABLE 3

[Evaluation Results]

|  |  | example 9 | example 10 | example 11 | example 12 | example 13 |
|---|---|---|---|---|---|---|
| 1st apex | length L1 [mm] | 35 | 35 | 35 | 35 | 35 |
|  | elastic modulus E1 [MPa] | 60 | 60 | 60 | 60 | 60 |
|  | loss tangent T1 [—] | 0.18 | 0.18 | 0.18 | 0.18 | 0.18 |
| 2nd apex | ratio (H2/Hb) [—] | 0.60 | 0.38 | 0.30 | 0.23 | 0.15 |
|  | length L2 [mm] | 40 | 25 | 20 | 15 | 10 |
|  | thickness t2 [mm] | 2.0 | 2.0 | 2.0 | 2.0 | 2.0 |
|  | elastic modulus E2 [MPa] | 60 | 60 | 60 | 60 | 60 |
|  | loss tangent Ts [—] | 0.18 | 0.18 | 0.18 | 0.18 | 0.18 |
| strip | ratio (Hsu/Hb) [—] | 0.99 | 0.99 | 0.99 | 0.99 | 0.99 |
|  | length Ls [mm] | 60 | 60 | 60 | 60 | 60 |
|  | ratio (Hss/Hb) [—] | 0.18 | 0.18 | 0.18 | 0.18 | 0.18 |
|  | thickness ts [mm] | 1.0 | 1.0 | 1.0 | 1.0 | 1.0 |
|  | elastic modulus Es [MPa] | 60 | 60 | 60 | 60 | 60 |
|  | loss tangent Ts [—] | 0.18 | 0.18 | 0.18 | 0.18 | 0.18 |
|  | planar torsional rigidity [—] | 112 | 110 | 107 | 106 | 105 |
|  | cornering power [—] | 107 | 105 | 101 | 100 | 100 |
|  | lateral rigidity [—] | 103 | 101 | 99 | 98 | 97 |
|  | near N [—] | 6.2 | 6.2 | 6.0 | 5.8 | 5.7 |
|  | lane change [—] | 6.2 | 6.2 | 6.0 | 5.8 | 5.7 |
|  | DRY cornering [—] | 6.2 | 6.2 | 6.0 | 5.8 | 5.7 |
|  | riding comfort [—] | 5.5 | 5.8 | 5.9 | 5.9 | 5.9 |

TABLE 3-continued

[Evaluation Results]

|  | example 9 | example 10 | example 11 | example 12 | example 13 |
|---|---|---|---|---|---|
| durability [—] | 104 | 104 | 104 | 103 | 102 |
| cost [—] | 113 | 110 | 108 | 107 | 106 |
| noise [—] | 100 | 100 | 100 | 100 | 100 |
| rolling resistance [—] | 101 | 100 | 100 | 100 | 100 |

TABLE 4

[Evaluation Results]

| | | example 14 | example 15 | example 16 |
|---|---|---|---|---|
| 1st apex | length L1 [mm] | 35 | 35 | 35 |
| | elastic modulus E1 [MPa] | 60 | 60 | 60 |
| | loss tangent T1 [—] | 0.18 | 0.18 | 0.18 |
| 2nd apex | ratio (H2/Hb) [—] | 0.54 | 0.54 | 0.54 |
| | length L2 [mm] | 30 | 30 | 30 |
| | thickness t2 [mm] | 1.0 | 3.0 | 4.0 |
| | elastic modulus E2 [MPa] | 60 | 60 | 60 |
| | loss tangent T2 [—] | 0.18 | 0.18 | 0.18 |
| strip | ratio (Hsu/Hb) [—] | 0.99 | 0.99 | 0.99 |
| | length Ls [mm] | 60 | 60 | 60 |
| | ratio (Hss/Hb) [—] | 0.18 | 0.18 | 0.18 |
| | thickness ts [mm] | 1.0 | 1.0 | 1.0 |
| | elastic modulus Es [MPa] | 60 | 60 | 60 |
| | loss tangent Ts [—] | 0.18 | 0.18 | 0.18 |
| planar torsional rigidity [—] | | 107 | 110 | 111 |
| cornering power [—] | | 101 | 107 | 108 |
| lateral rigidity [—] | | 101 | 102 | 103 |
| near N [—] | | 5.9 | 6.2 | 6.2 |
| lane change [—] | | 5.9 | 6.2 | 6.2 |
| DRY cornering [—] | | 5.9 | 6.2 | 6.2 |
| riding comfort [—] | | 5.9 | 5.7 | 5.6 |
| durability [—] | | 103 | 104 | 102 |
| cost [—] | | 104 | 111 | 113 |
| noise [—] | | 100 | 100 | 100 |
| rolling resistance [—] | | 100 | 101 | 101 |

TABLE 5

[Evaluation Results]

| | | example 17 | example 18 | example 19 | example 20 | comp. example 3 |
|---|---|---|---|---|---|---|
| 1st apex | length L1 [mm] | 35 | 35 | 35 | 35 | 35 |
| | elastic modulus E1 [MPa] | 60 | 60 | 60 | 60 | 60 |
| | loss tangent T1 [—] | 0.18 | 0.18 | 0.18 | 0.18 | 0.18 |
| 2nd apex | ratio (H2/Hb) [—] | 0.54 | 0.54 | 0.54 | 0.54 | 0.54 |
| | length L2 [mm] | 30 | 30 | 30 | 30 | 30 |
| | thickness t2 [mm] | 2.0 | 2.0 | 2.0 | 2.0 | 2.0 |
| | elastic modulus E2 [MPa] | 60 | 60 | 60 | 60 | 60 |
| | loss tangent T2 [—] | 0.18 | 0.18 | 0.18 | 0.18 | 0.18 |
| strip | ratio (Hsu/Hb) [—] | 0.70 | 0.80 | 0.85 | 1.0 | 1.1 |
| | length Ls [mm] | 40 | 45 | 50 | 61 | 70 |
| | ratio (Hss/Hb) [—] | 0.18 | 0.18 | 0.18 | 0.18 | 0.18 |
| | thickness ts [mm] | 1.0 | 1.0 | 1.0 | 1.0 | 1.0 |
| | elastic modulus Es [MPa] | 60 | 60 | 60 | 60 | 60 |
| | loss tangent Ts [—] | 0.18 | 0.18 | 0.18 | 0.18 | 0.18 |
| planar torsional rigidity [—] | | 108 | 109 | 110 | 111 | 114 |
| cornering power [—] | | 105 | 105 | 106 | 106 | 107 |
| lateral rigidity [—] | | 101 | 101 | 102 | 102 | 102 |
| near N [—] | | 5.8 | 6.1 | 6.2 | 6.2 | 6.2 |
| lane change [—] | | 5.8 | 6.1 | 6.2 | 6.2 | 6.2 |
| DRY cornering [—] | | 5.8 | 6.1 | 6.2 | 6.2 | 6.2 |
| riding comfort [—] | | 5.9 | 5.9 | 5.8 | 5.8 | 5.6 |
| durability [—] | | 104 | 104 | 104 | 104 | 104 |
| cost [—] | | 107 | 107 | 107 | 110 | 111 |
| noise [—] | | 100 | 100 | 100 | 100 | 100 |
| rolling resistance [—] | | 100 | 100 | 100 | 100 | 102 |

TABLE 6

[Evaluation Results]

| | | comp. example 4 | example 21 | example 22 | example 23 | example 24 |
|---|---|---|---|---|---|---|
| 1st apex | length L1 [mm] | 35 | 35 | 35 | 35 | 35 |
| | elastic modulus E1 [MPa] | 60 | 60 | 60 | 60 | 60 |
| | loss tangent T1 [—] | 0.18 | 0.18 | 0.18 | 0.18 | 0.18 |
| 2nd apex | ratio (H2/Hb) [—] | 0.54 | 0.54 | 0.54 | 0.54 | 0.54 |
| | length L2 [mm] | 30 | 30 | 30 | 30 | 30 |
| | thickness t2 [mm] | 2.0 | 2.0 | 2.0 | 2.0 | 2.0 |
| | elastic modulus E2 [MPa] | 60 | 60 | 60 | 60 | 60 |
| | loss tangent T2 [—] | 0.18 | 0.18 | 0.18 | 0.18 | 0.18 |
| strip | ratio (Hsu/Hb) [—] | 0.99 | 0.99 | 0.99 | 0.99 | 0.99 |
| | length Ls [mm] | 40 | 45 | 50 | 65 | 70 |
| | ratio (Hss/Hb) [—] | 0.41 | 0.33 | 0.28 | 0.10 | 0.03 |
| | thickness ts [mm] | 1.0 | 1.0 | 1.0 | 1.0 | 1.0 |
| | elastic modulus Es [MPa] | 60 | 60 | 60 | 60 | 60 |
| | loss tangent Ts [—] | 0.18 | 0.18 | 0.18 | 0.18 | 0.18 |
| | planar torsional rigidity [—] | 102 | 107 | 108 | 110 | 110 |
| | cornering power [—] | 100 | 104 | 105 | 106 | 106 |
| | lateral rigidity [—] | 95 | 100 | 101 | 102 | 102 |
| | near N [—] | 5.7 | 6.1 | 6.1 | 6.2 | 6.2 |
| | lane change [—] | 5.7 | 6.1 | 6.1 | 6.2 | 6.2 |
| | DRY cornering [—] | 5.7 | 6.1 | 6.1 | 6.2 | 6.2 |
| | riding comfort [—] | 5.9 | 5.9 | 5.9 | 5.7 | 5.6 |
| | durability [—] | 102 | 104 | 104 | 104 | 104 |
| | cost [—] | 106 | 106 | 108 | 111 | 112 |
| | noise [—] | 100 | 100 | 100 | 100 | 100 |
| | rolling resistance [—] | 100 | 100 | 100 | 100 | 100 |

TABLE 7

[Evaluation Results]

| | | example 25 | example 26 | example 27 | example 28 |
|---|---|---|---|---|---|
| 1st apex | length L1 [mm] | 35 | 35 | 35 | 35 |
| | elastic modulus E1 [MPa] | 60 | 60 | 60 | 60 |
| | loss tangent T1 [—] | 0.18 | 0.18 | 0.18 | 0.18 |
| 2nd apex | ratio (H2/Hb) [—] | 0.54 | 0.54 | 0.54 | 0.54 |
| | length L2 [mm] | 30 | 30 | 30 | 30 |
| | thickness t2 [mm] | 2.0 | 2.0 | 2.0 | 2.0 |
| | elastic modulus E2 [MPa] | 60 | 60 | 60 | 60 |
| | loss tangent T2 [—] | 0.18 | 0.18 | 0.18 | 0.18 |
| strip | ratio (Hsu/Hb) [—] | 0.99 | 0.99 | 0.99 | 0.99 |
| | length Ls [mm] | 60 | 60 | 60 | 60 |
| | ratio (Hss/Hb) [—] | 0.18 | 0.18 | 0.18 | 0.18 |
| | thickness ts [mm] | 0.5 | 0.8 | 1.5 | 2.0 |
| | elastic modulus Es [MPa] | 60 | 60 | 60 | 60 |
| | loss tangent Ts [—] | 0.18 | 0.18 | 0.18 | 0.18 |
| | planar torsional rigidity [—] | 107 | 109 | 111 | 112 |
| | cornering power [—] | 105 | 105 | 106 | 107 |
| | lateral rigidity [—] | 102 | 102 | 103 | 104 |
| | near N [—] | 6.0 | 6.1 | 6.2 | 6.2 |
| | lane change [—] | 6.0 | 6.1 | 6.2 | 6.2 |
| | DRY cornering [—] | 6.0 | 6.1 | 6.2 | 6.2 |
| | riding comfort [—] | 5.9 | 5.8 | 5.7 | 5.6 |
| | durability [—] | 104 | 104 | 104 | 104 |
| | cost [—] | 108 | 110 | 111 | 112 |
| | noise [—] | 100 | 100 | 100 | 100 |
| | rolling resistance [—] | 100 | 100 | 100 | 101 |

TABLE 8

[Evaluation Results]

| | | comp. example 5 | example 29 | comp. example 6 |
|---|---|---|---|---|
| 1st apex | length L1 [mm] | 35 | 35 | 35 |
| | elastic modulus E1 [MPa] | 40 | 70 | 80 |
| | loss tangent T1 [—] | 0.18 | 0.18 | 0.18 |
| 2nd apex | ratio (H2/Hb) [—] | 0.54 | 0.54 | 0.54 |
| | length L2 [mm] | 30 | 30 | 30 |
| | thickness t2 [mm] | 2.0 | 2.0 | 2.0 |
| | elastic modulus E2 [MPa] | 40 | 70 | 80 |
| | loss tangent T2 [—] | 0.18 | 0.18 | 0.18 |
| strip | ratio (Hsu/Hb) [—] | 0.99 | 0.99 | 0.99 |
| | length Ls [mm] | 60 | 60 | 60 |
| | ratio (Hss/Hb) [—] | 0.18 | 0.18 | 0.18 |
| | thickness ts [mm] | 1.0 | 1.0 | 1.0 |
| | elastic modulus Es [MPa] | 40 | 70 | 80 |
| | loss tangent Ts [—] | 0.18 | 0.18 | 0.18 |
| | planar torsional rigidity [—] | 109 | 111 | 113 |
| | cornering power [—] | 105 | 106 | 106 |
| | lateral rigidity [—] | 101 | 102 | 102 |
| | near N [—] | 6.0 | 6.2 | 6.2 |
| | lane change [—] | 6.0 | 6.2 | 6.2 |
| | DRY cornering [—] | 6.0 | 6.2 | 6.2 |
| | riding comfort [—] | 5.8 | 5.8 | 5.7 |
| | durability [—] | 104 | 104 | 104 |
| | cost [—] | 110 | 110 | 110 |
| | noise [—] | 100 | 100 | 101 |
| | rolling resistance [—] | 100 | 100 | 100 |

As shown in Tables 1~8, the tires of examples are given a higher evaluation than the tires of comparative examples. From those evaluation results, it is clear that the tires according to embodiments of the present invention are excellent.

The pneumatic tires described above can be equipped on various types of vehicles.

A pair of beads is provided for a tire. A carcass is set to bridge the beads on both sides. A bead has a core and an apex extending from the core in a radially outward direction. A carcass ply of the carcass is usually turned up around the core from the axially inner side toward the outer side. Due to such a structure, the carcass ply is divided into a main portion and a turn-up portion.

The bead portion of a tire is fixed onto a rim. When a car is running, the bead portion receives a greater load. Thus, the durability of the bead portion is important. Various studies have been conducted to improve the durability of the bead portion. JP2005-255047A describes an example of such studies. The entire contents of this publication are incorporated herein by reference.

In a normal tire, a clinch is provided for the axially outer side of a bead. A clinch abuts the flange of a rim. The aforementioned turn-up portion is positioned between the clinch and the bead.

When a car is running, a greater load is exerted on the bead portion as described above. A turn-up portion is positioned between the clinch and the bead. Thus, warping tends to concentrate on the turn-up portion. When warping concentrates on a portion, ply loose may occur in the portion. To prevent ply loose, for example, a clinch may be made thicker so as to provide a greater flexural rigidity at the bead portion. However, such tuning of rigidity adversely affects the steering stability of the tire.

Providing greater flexural rigidity to the bead portion affects the longitudinal rigidity of a tire. A greater longitudinal rigidity not only decreases riding comfort but also increases noise in a frequency range of 80~100 Hz. The quietness of a tire may decrease. In addition, the above-described thicker clinch increases the mass of a tire. A greater mass adversely affects the rolling resistance of a tire. Thus, such a tire may lower the fuel efficiency of the vehicle.

A pneumatic tire according to an embodiment of the present invention exhibits enhanced durability but does not lower steering stability.

A pneumatic tire according to an embodiment of the present invention has the following: a tread with its outer surface set as the tread surface; a pair of sidewalls each extending from the tread edge in an approximately radially inward direction; a pair of clinches each extending from the sidewall edge in an approximately radially inward direction; a pair of beads each disposed on the axially inner side of the clinch; a carcass spread along the inner side of the tread and sidewalls to bridge the bead on one side and the bead on the other side; and a pair of strips each extending from the bead along the carcass in an approximately radially outward direction. The bead is formed with a core, a first apex extending from the core in a radially outward direction, and a second apex disposed on the axially outer side of the first apex. The carcass is formed with a carcass ply. The carcass ply is turned up around the core from the axially inner side toward the outer side. Because of the turn-up structure, the carcass ply is divided into a main portion and a turn-up portion. The radially inner edge of the strip is positioned between the main portion and the turn-up portion. The second apex is positioned between the turn-up portion and the clinch. The position of the outer edge of the strip corresponds to the point of maximum width of the tire, or the position is located on the inner side of such a point, in a radial direction. The outer edge of the second apex is positioned on the radially inner side of the outer edge of the strip. The second apex is made of a crosslinked rubber, and the complex elastic modulus of the second apex is at least 60 MPa but no greater than 70 MPa.

The strip of the pneumatic tire is preferred to be made of a crosslinked rubber with the same properties as that used for the second apex.

The thickness of the strip in the pneumatic tire is preferred to be at least 0.5 mm but no greater than 2 mm.

The thickness of the second apex in the pneumatic tire is preferred to be at least 1 mm but no greater than 4 mm.

The length of the first apex in the pneumatic tire is preferred to be at least 5 mm but no greater than 40 mm.

The first apex in the pneumatic tire is preferred to be made of a crosslinked rubber with the same properties as that used in the second apex.

In a pneumatic tire according to an embodiment of the present invention, a second apex is positioned between the clinch and the turn-up portion of the carcass ply. The turn-up portion of the tire is disposed further on an axially inner side than is the turn-up portion of a conventional tire. Such positioning suppresses concentration of deformation on the turn-up portion. Since ply loose is suppressed, excellent durability of the tire is achieved. Moreover, the inner edge of the strip of the tire is positioned between the main portion and the turn-up portion, while its outer edge is positioned at the point of maximum width, or on the inner side of such a point, in a radial direction. The strip, together with the second apex, contributes to planar torsional rigidity of the tire. Since the outer edge of the second apex is positioned on the radially inner side of the outer edge of the strip, the strip and the second apex properly contribute to planar torsional rigidity. Steering stability is properly maintained by the strip and the second apex. A pneumatic tire according to an embodiment of the present invention has enhanced durability without lowering steering stability.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire, comprising:
   a tread having an outer surface setting a tread surface;
   a pair of sidewalls extending from tread edges approximately in a radially inward direction, respectively;
   a pair of clinches extending from sidewall edges approximately in the radially inward direction, respectively;
   a pair of beads positioned on axially inner sides of the clinches, respectively;
   a carcass spreading along an inner side of the tread and sidewalls such that the carcass bridges one of the beads on one side and the other one of the beads on the other side; and
   a pair of strips extending from the beads along the carcass approximately in a radially outward direction, respectively,
   wherein each of the beads includes a core, a first apex extending from the core in the radially outward direction, and a second apex positioned on an axially outer side of the first apex, the carcass includes a carcass ply which is turned up around the core from the axially inner side toward an outer side such that the carcass ply is divided into a main portion and a turn-up portion, each of the strips has a radially inner edge positioned between the main portion and the turn-up portion, the second apex is positioned between the turn-up portion and each of the clinches, each of the strips has an outer edge positioned to correspond to or on an inner side of a point of maximum width of the pneumatic tire in a radial direction, the second apex has an outer edge positioned on a radially inner side of the outer edge of each of the strips, the second apex comprises a crosslinked rubber and has a complex elastic modulus in a range of from 60 MPa to 70 MPa, each of the strips comprises a crosslinked rubber, and the crosslinked rubber of the second apex and the crosslinked rubber of each of the strips have a same loss tangent and a same elastic modulus.

2. The pneumatic tire according to claim 1, wherein each of the strips has a thickness which is set in a range of from 0.5 mm to 2 mm.

3. The pneumatic tire according to claim 1, wherein the second apex has a thickness which is set in a range of from 1 mm to 4 mm.

4. The pneumatic tire according to claim 1, wherein the first apex has a length which is set in a range of from 5 mm to 40 mm.

5. The pneumatic tire according to claim 1, wherein the first apex comprises a crosslinked rubber, and the crosslinked rubber of the first apex and the crosslinked rubber of the second apex have a same loss tangent and a same elastic modulus.

6. The pneumatic tire according to claim 1, wherein the second apex is made of the crosslinked rubber, each of the strips is made of the crosslinked rubber, and the strips are formed to have a ratio Hsu/Hb in a range of 0.7 to 1 where Hsu is a height measured in a radial direction from a bead base line BBL to the outer edge of each of the strips, and Hb is a height measured in the radial direction from the bead base line BBL to a point Pb of a maximum width of the pneumatic tire in an axial direction.

7. The pneumatic tire according to claim 1, wherein the second apex is made of the crosslinked rubber, and each of the strips has a thickness which is set in a range of from 0.5 mm to 2 mm.

8. The pneumatic tire according to claim 1, wherein the second apex is made of the crosslinked rubber, the first apex is made of a crosslinked rubber, the crosslinked rubber of the first apex and the crosslinked rubber of the second apex have a same loss tangent and a same elastic modulus, and the second apex is formed to have a ratio H2/Hb in a range of 0.1 to 0.6 where H2 is a height measured in a radial direction from a bead base line BBL to the outer edge of the second apex, and Hb is a height measured in the radial direction from the bead base line BBL to a point Pb of a maximum width of the pneumatic tire in an axial direction.

9. A pneumatic tire, comprising:
a tread having an outer surface setting a tread surface;
a pair of sidewalls extending from tread edges approximately in a radially inward direction, respectively;
a pair of clinches extending from sidewall edges approximately in the radially inward direction, respectively;
a pair of beads positioned on axially inner sides of the clinches, respectively;
a carcass spreading along an inner side of the tread and sidewalls such that the carcass bridges one of the beads on one side and the other one of the beads on the other side; and
a pair of strips extending from the beads along the carcass approximately in a radially outward direction, respectively,
wherein each of the beads includes a core, a first apex extending from the core in the radially outward direction, and a second apex positioned on an axially outer side of the first apex, the carcass includes a carcass ply which is turned up around the core from the axially inner side toward an outer side such that the carcass ply is divided into a main portion and a turn-up portion, each of the strips has a radially inner edge positioned between the main portion and the turn-up portion, the second apex is positioned between the turn-up portion and each of the clinches, each of the strips has an outer edge positioned to correspond to or on an inner side of a point of maximum width of the pneumatic tire in a radial direction, the second apex has an outer edge positioned on a radially inner side of the outer edge of each of the strips, the second apex comprises a crosslinked rubber and has a complex elastic modulus in a range of from 60 MPa to 70 MPa, the first apex comprises a crosslinked rubber, and the crosslinked rubber of the first apex and the crosslinked rubber of the second apex have a same loss tangent and a same elastic modulus.

10. The pneumatic tire according to claim 9, wherein the second apex has a thickness which is set in a range of from 1 mm to 4 mm.

11. The pneumatic tire according to claim 9, wherein the first apex has a length which is set in a range of from 5 mm to 40 mm.

12. The pneumatic tire according to claim 9, wherein each of the strips has a thickness which is set in a range of from 0.5 mm to 2 mm.

13. The pneumatic tire according to claim 9, wherein the second apex is made of the crosslinked rubber, each of the strips is made of a crosslinked rubber, the crosslinked rubber of the second apex and the crosslinked rubber of each of the strips have a same loss tangent and a same elastic modulus, and the strips are formed to have a ratio Hsu/Hb in a range of 0.7 to 1 where Hsu is a height measured in a radial direction from a bead base line BBL to the outer edge of each of the strips, and Hb is a height measured in the radial direction from the bead base line BBL to a point Pb of a maximum width of the pneumatic tire in an axial direction.

14. The pneumatic tire according to claim 9, wherein the second apex is made of the crosslinked rubber, the outer edge of the second apex is formed in contact with a respective one of the strips, and each of the clinches has an outer edge formed in contact with a respective one of the strips such that the outer edge of each of the clinches is positioned a radially outer side of the outer edge of the second apex.

15. A pneumatic tire, comprising:
a tread having an outer surface setting a tread surface;
a pair of sidewalls extending from tread edges approximately in a radially inward direction, respectively;
a pair of clinches extending from sidewall edges approximately in the radially inward direction, respectively;
a pair of beads positioned on axially inner sides of the clinches, respectively;
a carcass spreading along an inner side of the tread and sidewalls such that the carcass bridges one of the beads on one side and the other one of the beads on the other side; and
a pair of strips extending from the beads along the carcass approximately in a radially outward direction, respectively,
wherein each of the beads includes a core, a first apex extending from the core in the radially outward direction, and a second apex positioned on an axially outer side of the first apex, the carcass includes a carcass ply which is turned up around the core from the axially inner side toward an outer side such that the carcass ply is divided into a main portion and a turn-up portion, each of the strips has a radially inner edge positioned between the main portion and the turn-up portion, the second apex is positioned between the turn-up portion and each of the clinches, each of the strips has an outer edge positioned to correspond to or on an inner side of a point of maximum width of the pneumatic tire in a radial direction, the second apex has an outer edge positioned on a radially inner side of the outer edge of each of the strips, the second apex is made of a crosslinked rubber and has a complex elastic modulus in a range of from 60 MPa to 70 MPa, the outer edge of the second apex is formed in contact with a respective one of the strips, and each of the clinches has an outer edge formed in contact with a respective one of the strips such that the outer edge of each of the clinches is positioned a radially outer side of the outer edge of the second apex.

16. The pneumatic tire according to claim 15, wherein each of the strips has a thickness which is set in a range of from 0.5 mm to 2 mm.

17. The pneumatic tire according to claim 15, wherein the second apex has a thickness which is set in a range of from 1 mm to 4 mm.

18. The pneumatic tire according to claim 15, wherein the first apex has a length which is set in a range of from 5 mm to 40 mm.

19. The pneumatic tire according to claim 15, wherein the first apex is made of a crosslinked rubber, and the crosslinked rubber of the first apex and the crosslinked rubber of the second apex have a same loss tangent and a same elastic modulus.

20. The pneumatic tire according to claim 15, wherein each of the strips is made of a crosslinked rubber, and the crosslinked rubber of the second apex and the crosslinked rubber of each of the strips have a same loss tangent and a same elastic modulus.

* * * * *